United States Patent [19]

Thomas

[11] Patent Number: 5,639,177

[45] Date of Patent: *Jun. 17, 1997

[54] TELESCOPIC SHAFT WITH CONTROL FOR ANTILASH SPRING

[75] Inventor: Steven Mark Thomas, Saginaw, Mich.

[73] Assignee: General Motors Corporation, Detroit, Mich.

[*] Notice: The term of this patent shall not extend beyond the expiration date of Pat. No. 5,509,324.

[21] Appl. No.: 598,754

[22] Filed: Feb. 8, 1996

[51] Int. Cl.$^6$ .................................................. B62D 1/16
[52] U.S. Cl. ........................ 403/377; 403/325; 403/109; 74/531; 74/493
[58] Field of Search ............................... 403/377, 376, 403/325, 109; 74/493, 531

[56] References Cited

U.S. PATENT DOCUMENTS

| | | | |
|---|---|---|---|
| 2,893,766 | 7/1959 | Meyer. | |
| 3,527,123 | 9/1970 | Dovey. | |
| 3,884,087 | 5/1975 | Sakaki. | |
| 4,106,311 | 8/1978 | Euler | 403/377 X |
| 4,257,244 | 3/1981 | Welschof. | |
| 4,435,105 | 3/1984 | Rampley | 403/109 |
| 4,509,775 | 4/1985 | Arndt | 280/779 |
| 4,693,136 | 9/1987 | Clerc et al. | 74/492 |
| 4,833,936 | 5/1989 | Mariani et al. | 74/493 |
| 5,150,771 | 9/1992 | Porter | 188/67 |
| 5,219,045 | 6/1993 | Porter et al. | 74/531 X |
| 5,221,154 | 6/1993 | Foulquier et al. | 403/377 X |
| 5,509,324 | 4/1996 | Cymbal | 403/109 X |

*Primary Examiner*—Anthony Knight
*Attorney, Agent, or Firm*—Saul Schwartz

[57] ABSTRACT

An intermediate steering shaft including a polygonal tubular shaft, a polygonal solid shaft telescopically received in the polygonal tubular shaft, a spring which thrusts the solid and tubular shafts in opposite lateral directions to eliminate lash attributable to running clearance between the solid and tubular shafts, and a control operative from outside of the tubular shaft to relieve the lateral thrust of the spring. The solid shaft has an outside longitudinal groove facing an inside longitudinal groove in the tubular shaft and cooperating with the inside longitudinal groove in defining a longitudinal passage between the solid and tubular shafts. The spring is a helical coil spring wedged between the inside and the outside longitudinal grooves. The control includes a lever on the coil spring and a lateral slot in the tubular shaft through which the lever protrudes. Pivoting the lever from a locked position to an unlocked position twists the coil spring to reduce its outside diameter to less than the depth of the longitudinal passage so that the solid shaft can be easily inserted in and longitudinally translated relative to the tubular shaft.

4 Claims, 4 Drawing Sheets

5,639,177

TELESCOPIC SHAFT WITH CONTROL FOR ANTILASH SPRING

FIELD OF THE INVENTION

This invention relates to an intermediate steering shaft for a motor vehicle.

BACKGROUND OF THE INVENTION

An intermediate steering shaft connects a primary or main steering shaft on a steering column of a motor vehicle with an input shaft of a steering gear on the vehicle remote from the steering column. Typically, the intermediate steering shaft includes telescopically related solid and tubular shafts having complementary polygonal cross sections for unitary rotation and enough running clearance to permit relative telescopic translation of the shafts for installation of the intermediate steering shaft between the primary steering shaft and the steering gear input shaft. A stiff spring is often interposed between the solid and tubular shafts to eliminate angular lash attributable to the aforesaid running clearance by thrusting the shafts laterally against each other. The thrust of the spring, however, induces friction between the solid and tubular shafts which makes it relatively difficult for an operator to manually vary the length of the intermediate steering shaft during installation.

SUMMARY OF THE INVENTION

This invention is a new and improved intermediate steering shaft including a polygonal tubular shaft, a polygonal solid shaft telescopically received in the polygonal tubular shaft, a spring which thrusts the solid and tubular shafts in opposite lateral directions to eliminate lash attributable to running clearance between the solid and tubular shafts, and a control operative from outside of the tubular shaft to relieve the lateral thrust of the spring. The solid shaft has an outside longitudinal groove facing an inside longitudinal groove in the tubular shaft and cooperating therewith in defining a longitudinal passage between the solid and tubular shafts. The spring is a helical coil spring in the longitudinal groove in the tubular shaft having its, opposite ends attached to the tubular shaft and an outside diameter which exceeds the depth of the longitudinal passage. The control includes a lever on the coil spring and a lateral slot in the tubular shaft through which the lever protrudes. Pivoting the lever from a locked position to an unlocked position twists the coil spring to reduce its outside diameter to less than the depth of the longitudinal passage so that the solid shaft can be easily inserted in and longitudinally translated relative to the tubular shaft. When the lever is released, the spring unwinds and expands radially to fill the longitudinal passage and thrust the solid and tubular shafts in opposite lateral directions.

DESCRIPTION OF A PREFERRED EMBODIMENT

Figure 1:
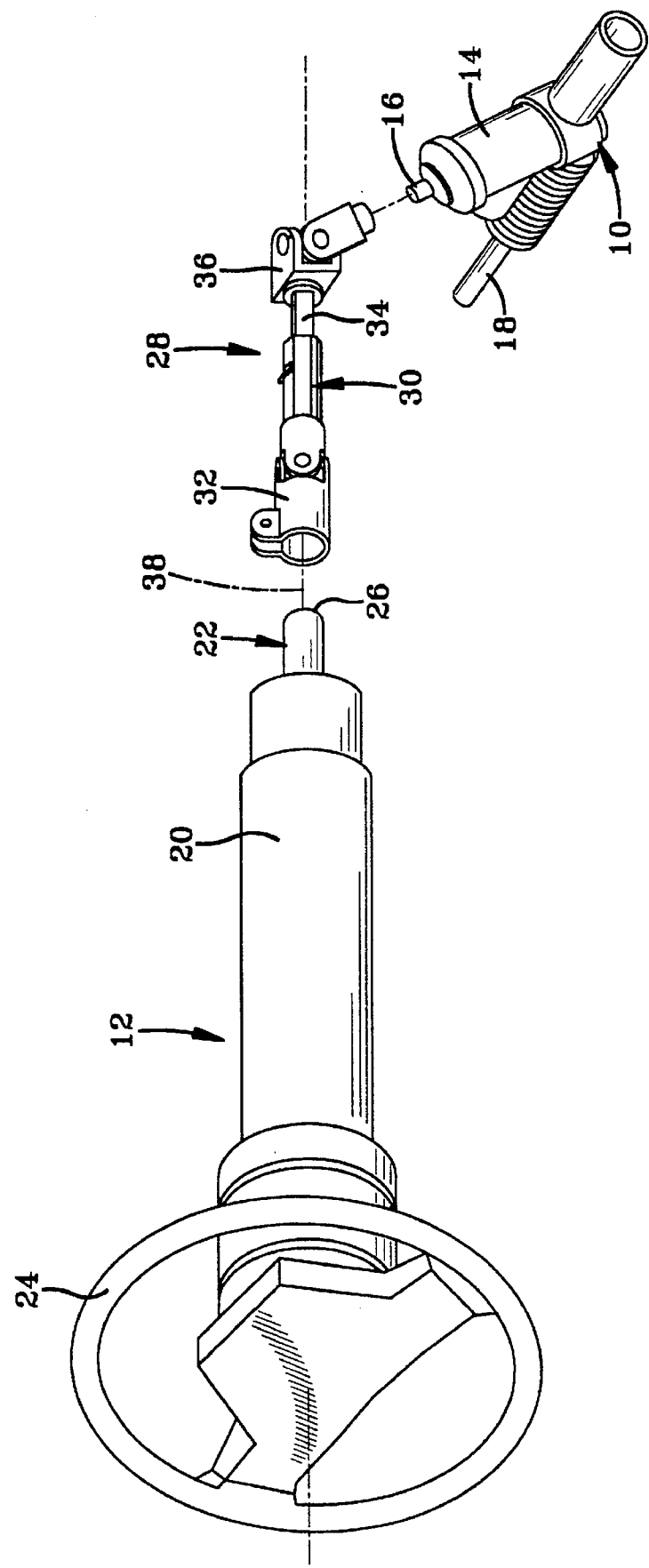
FIG. 1 is a schematic perspective view of an intermediate steering shaft according to this invention between a steering column and a steering gear of a motor vehicle.
Figure 2:
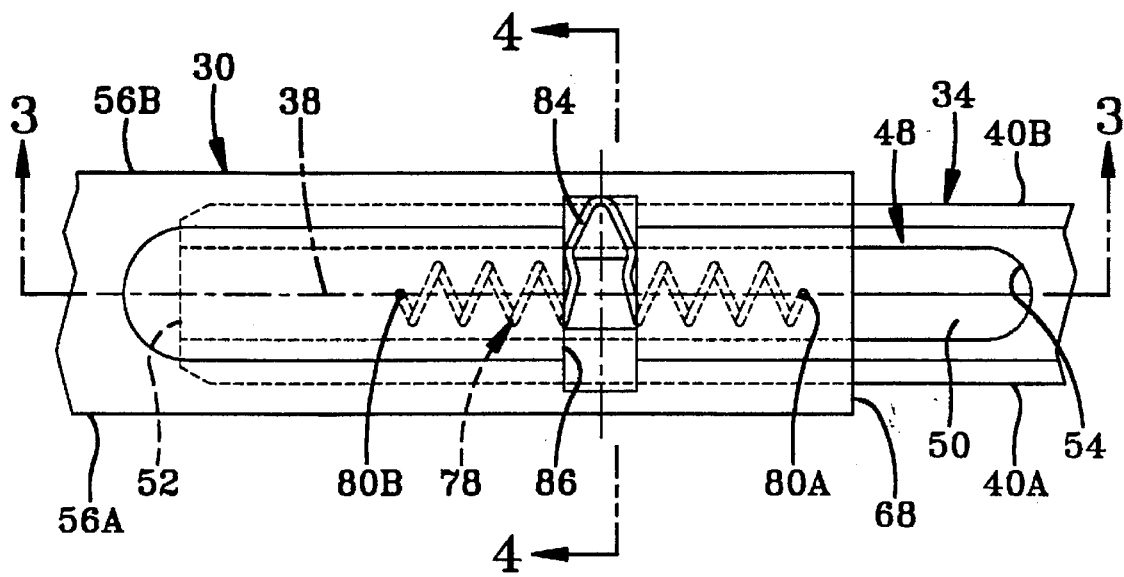
FIG. 2 is a fragmentary view of the intermediate steering shaft according to this invention.

Referring to FIG. 1, a motor vehicle, not shown, has mounted thereon a steering gear 10 and a steering column 12. The steering gear 10 includes a housing 14, an input shaft 16 rotatably supported on the housing 14, a rack bar 18, and rack and pinion gearing, not shown, in the housing which converts rotation of the input shaft 16 to lateral translation of the rack bar 18. Opposite ends, not shown, of the rack bar are linked to steerable wheels of the motor vehicle in conventional fashion so that rotation of the input shaft 16 steers the vehicle.

The steering column 12 includes a tubular mast jacket 20, a main or primary steering shaft 22 rotatably supported on the mast jacket, and a steering wheel 24 rigidly connected to the primary steering shaft at the top of the mast jacket. The span between a lower end 26 of the primary steering shaft 22 and the steering gear input shaft 16 is bridged by an intermediate steering shaft 28 according to this invention.

The intermediate steering shaft 28 includes a polygonal tubular shaft 30 connected to the lower end 26 of the primary steering shaft through an upper universal joint 32 and a polygonal solid shaft 34 connected to the steering gear input shaft 16 through a lower universal joint 36 and telescoped inside of the tubular shaft. The polygonal solid shaft 34 has a generally rectangular cross sectional shape in a plane perpendicular to a longitudinal centerline 38 of the intermediate steering shaft and includes a pair of flat sidewalls 40A–40B, a first end wall 42 having a pair of lobes 44A–44B separated by a trough 46, and an arched second end wall 48. A generally V-shaped outside groove 50 in the arched end wall 48 extends parallel to the longitudinal centerline 38 from a distal end 52 of the solid shaft to a shoulder 54.

The polygonal tubular shaft 30 has a generally rectangular cross sectional shape in a plane perpendicular to the longitudinal centerline 38 complementary to that of the solid shaft and includes a pair of flat side walls 56A–56B facing the flat side walls 40A–40B of the solid shaft, a first end wall 58 having a pair of troughs 60A–60B on opposite sides of a lobe 62 facing, respectively, the lobes 44A–44B and the trough 46 on the solid shaft, and an arched second end wall 64 facing the arched second end wall 48 on the solid shaft. A generally V-shaped inside groove 66 in the arched end wall 64 faces the outside V-shaped groove 50 in the solid shaft and extends parallel to the longitudinal centerline 38 from a distal end 68 of the tubular shaft to a shoulder 70. The facing V-shaped grooves 50,66 form a longitudinal passage 72 between the solid and the tubular shafts 34,30.

Figure 4:
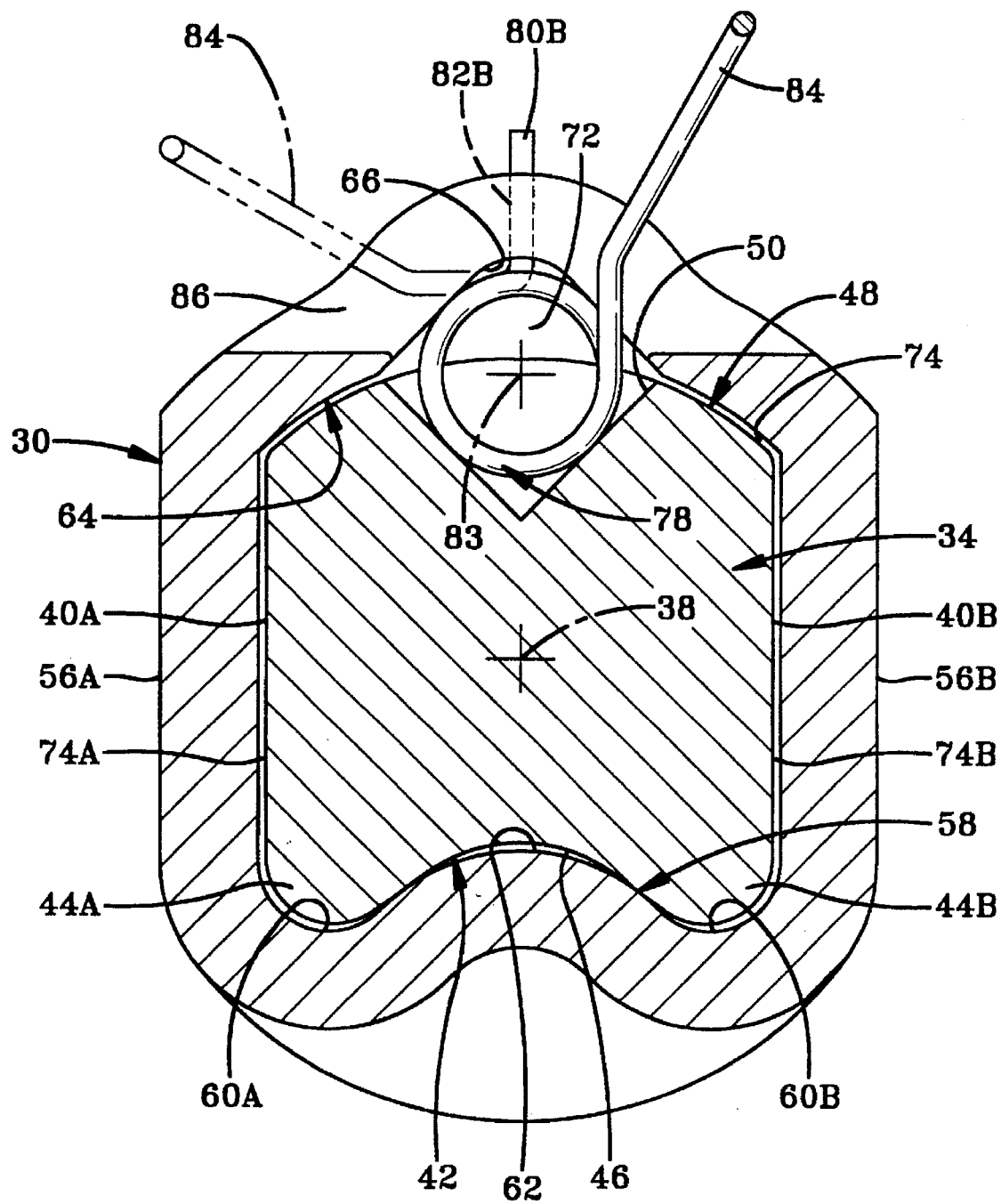
FIG. 4 is a sectional view taken generally along the plane indicated by lines 4—4 in FIG. 2.

The flat sides 40A–40B and end walls 42,48 of the solid shaft cooperate with the flat sides 56A–56B and the end walls 58,64 of the tubular shaft to transfer torque between the shafts. Running clearance between the solid and tubular shafts 34,30 is illustrated in exaggerated fashion in FIG. 4 as a gap 74 between the arched end walls 48,64 and as a pair of gaps 74A–76B between the side walls 40A,56A and 40B,56B. Unless eliminated, the aforesaid running clearance manifests itself as angular lash or angular play between the solid and tubular shafts 34,30 at every reversal of torque transfer between the shafts.

Figure 3:
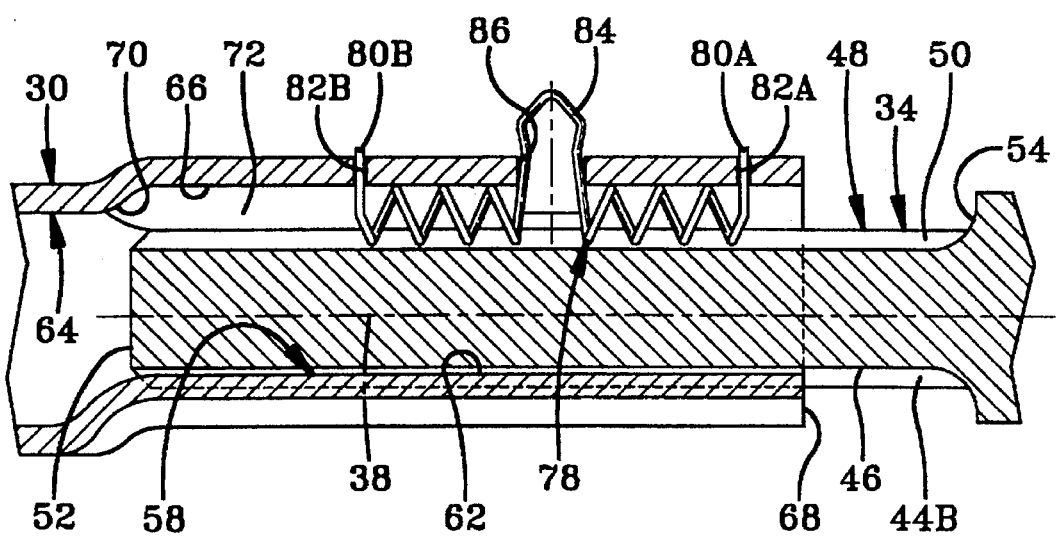
FIG. 3 is a sectional view taken generally along the plane indicated by lines 3—3 in FIG. 2.
Figure 5:
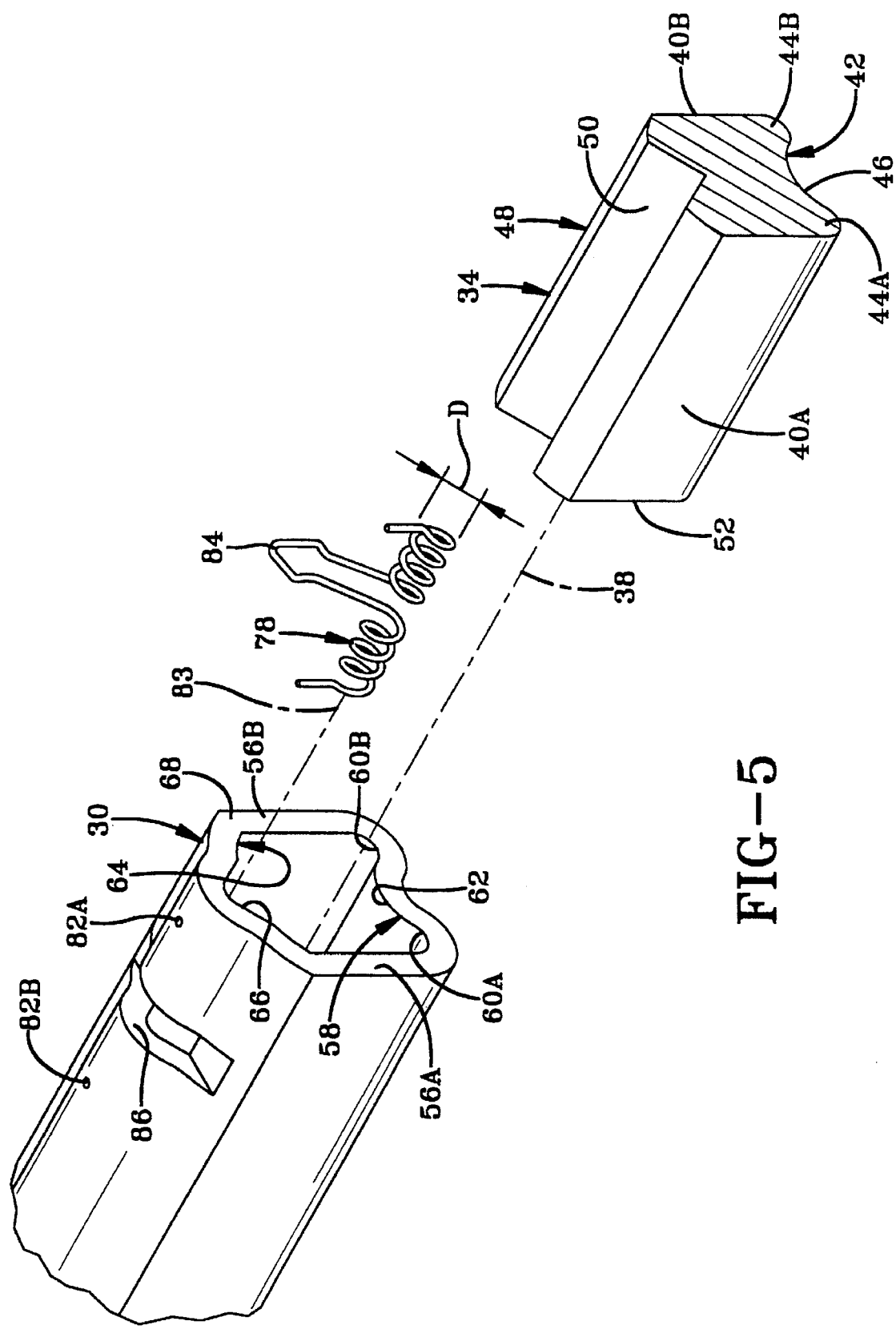
FIG. 5 is a fragmentary, exploded perspective view of the intermediate steering shaft according to this invention.

A coil torsion spring 78 in the longitudinal passage 72 has a pair of integral, radially extending pins 80A–80B at opposite ends seated in respective ones of a pair of radial sockets 82A–82B, FIGS. 3 and 5, in the tubular shaft 30 at the apex of the V-shaped inside groove 66. The spring is twisted about a longitudinal centerline 83 of the spring before attachment to the tubular shaft to preload the pins 80A–80B in the sockets 82A–82B for retention of the spring and to establish an outside diameter dimension "D" of the spring, FIG. 5, which exceeds the size of the longitudinal passage 72 so that the spring wedges itself between the grooves 50,66. When wedged between the grooves 50,66, the spring 78 eliminates running clearance between the solid and tubular shafts by thrusting the solid shaft 34 and the tubular shaft 30 in opposite lateral directions until the lobes 44A–44B seat in the troughs 60A–60B and the lobe 62 seats in the trough 46, FIG. 4. The spring 78 is stiff to transfer torque between the solid and tubular shafts 34,30 without significant deflection and, therefore, induces substantial friction between the engaged surfaces of the solid and tubular shafts which inhibits relative telescopic translation between the solid and tubular shafts.

A control for the coil spring 78 includes a radial lever 84 integral with the spring 78 about midway between its ends and a lateral slot 86 in the tubular shaft 30 through which the lever 84 protrudes for manipulation from outside of the tubular shaft. The lever 84 has first or locked position, FIG. 4, corresponding to the spring 78 being wedged between the grooves 50,66 and eliminating angular lash between the solid and tubular shafts 34,30 as described above, and a second or unlocked position, illustrated in broken lines in FIG. 4, rotated counterclockwise from the locked position about the centerline 83 of the spring and corresponding to the outside diameter of the spring being less than the size of the longitudinal passage 72. In the unlocked position of the lever 84, the thrust of the spring 78 and the corresponding friction between the solid and tubular shafts 34,30 is relieved so that the shafts are easily telescopically slideable relative to each other.

To initially assemble the solid shaft 34 in the tubular shaft 30, the lever 84 is pivoted from its locked position to its unlocked position to reduce the outside diameter of the spring 78. The solid shaft is then inserted in the tubular shaft without interference between the spring 78 and the solid shaft. When the lever is released, it automatically returns to its locked position as the spring 78 unwinds until becoming wedged between the grooves 50,66. The spring 78 thus maintains the solid and tubular shafts as a unitized assembly for easy transport to a vehicle assembly facility.

At the vehicle assembly facility, an operator rotates the lever 84 from outside of the tubular shaft 30 from its locked position to its unlocked position to relieve the lateral thrust between the solid and tubular shafts 34,30. With the lever in its unlocked position, the operator varies the length of the intermediate steering shaft to fit it between and to connect the upper and lower universal joints 32,36 to the primary steering shaft 22 and to the steering gear input shaft 16. When the installation is complete, the operator releases the lever 84 which then automatically returns to its locked position as the spring 78 unwinds until becoming wedged between the grooves 50,66. Thereafter, torque transfer between the solid and tubular shafts 34,30 is substantially free of angular lash.

I claim:

1. A telescopic shaft comprising:
   a polygonal tubular shaft,
   a polygonal solid shaft telescopically slidably disposed in said polygonal tubular shaft with running clearance therebetween rotatable as unit with said tubular shaft,
   a spring means concealed between said tubular shaft and said solid shaft operative to eliminate said running clearance by thrusting said solid shaft and said tubular shaft laterally against each other, and
   a control means actuated from outside of said tubular shaft to selectively relieve lateral thrust attributable to said spring means and corresponding friction between said solid shaft and said tubular shaft attributable to such lateral thrust.

2. The telescopic shaft recited in claim 1 further comprising:
   an inside groove in said tubular shaft parallel to a longitudinal centerline of said telescopic shaft, and
   an outside groove in said solid shaft parallel to said longitudinal centerline of said telescopic shaft facing said inside groove in said tubular shaft and cooperating therewith in defining a longitudinal passage between said solid shaft and said tubular shaft, and
   said spring means comprises a coil torsion spring mounted in said longitudinal passage having an outside diameter exceeding the size of said longitudinal passage so that said coil spring is wedged between said inside groove and said outside groove thereby to thrust said solid shaft and said tubular shaft laterally against each other.

3. The telescopic shaft recited in claim 2 wherein said control means actuated from outside of said tubular shaft comprises,
   a radial lever on said coil torsion spring operative when rotated from a locked position to an unlocked about a centerline of said coil torsion spring to twist said spring and thereby reduce said outside diameter thereof to less than the size of said longitudinal passage, and
   a lateral slot in said tubular shaft through which said radial lever protrudes.

4. The telescopic shaft recited in claim 3 further comprising:
   means operative to connect said tubular shaft to one of a primary steering shaft of a motor vehicle and a steering gear input shaft of said motor vehicle, and
   means operative to connect said solid shaft to the other of said primary steering shaft and said steering gear input shaft so that said telescopic shaft is an intermediate steering shaft between said primary steering shaft and said steering gear input shaft.

* * * * *